US012008500B2

(12) United States Patent
Ostrikov et al.

(10) Patent No.: US 12,008,500 B2
(45) Date of Patent: Jun. 11, 2024

(54) DYNAMIC NEXT OPERATION DETERMINATION FOR WORKFLOWS

(71) Applicant: Microsoft Technology Licensing, LLC, Redmond, WA (US)

(72) Inventors: Alexander Ostrikov, Herzliya (IL); Royi Ronen, Tel Aviv (IL); Ashwini Kumar Dalai, Bangalore (IN); Pooja Bhalla, Bengaluru (IN); Atul Agarwal, Hyderabad (IN); Greeshma Singh, Noida (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 17/808,454

(22) Filed: Jun. 23, 2022

(65) Prior Publication Data
US 2023/0419215 A1    Dec. 28, 2023

(51) Int. Cl.
*G06Q 10/0631* (2023.01)
*G06Q 10/0633* (2023.01)

(52) U.S. Cl.
CPC ... *G06Q 10/06316* (2013.01); *G06Q 10/0633* (2013.01)

(58) Field of Classification Search
CPC .......................................... G06Q 10/00–50/00
USPC ................................................. 705/7.11–7.42
See application file for complete search history.

(56) References Cited

U.S. PATENT DOCUMENTS

| | | | | |
|---|---|---|---|---|
| 5,745,687 A | * | 4/1998 | Randell | G06Q 10/10 709/201 |
| 6,041,306 A | * | 3/2000 | Du | G06Q 10/06316 705/7.26 |
| 7,428,495 B2 | * | 9/2008 | Dhar | G06Q 40/03 705/7.26 |
| 8,015,541 B1 | * | 9/2011 | Srinivasan | G06F 8/34 717/109 |
| 9,411,568 B2 | * | 8/2016 | Syme | G06F 8/445 |
| 10,282,229 B2 | * | 5/2019 | Wagner | G06F 9/5038 |
| 2004/0111430 A1 | * | 6/2004 | Hertling | G06Q 10/06 |
| 2004/0199867 A1 | * | 10/2004 | Brandenborg | G06Q 10/06 715/201 |
| 2006/0074730 A1 | * | 4/2006 | Shukla | G06Q 10/0633 705/7.26 |
| 2009/0193427 A1 | * | 7/2009 | Pu | G06F 9/5072 718/104 |

(Continued)

OTHER PUBLICATIONS

"International Search Report and Written Opinion Issued in PCT Application No. PCT/US23/022443", dated Jul. 5, 2023, 15 Pages.

*Primary Examiner* — Alan S Miller
(74) *Attorney, Agent, or Firm* — Holzer Patel Drennan

(57) ABSTRACT

A next operation in a workflow corresponding to a subject matter is automatically generated. A subject matter data record is received, including one or more historical operations previously executed in the workflow and a workflow template including one or more dynamic workflow nodes. At least one next operation is programmatically generated from the one or more dynamic workflow nodes based on the one or more historical operations previously executed in the workflow, wherein the at least one next operation is parameterized based on content in the subject matter data record. The at least one programmatically generated next operation is output into the workflow for execution.

20 Claims, 5 Drawing Sheets

(56) References Cited

U.S. PATENT DOCUMENTS

| | | | |
|---|---|---|---|
| 2010/0175065 A1* | 7/2010 | Uchida | G06Q 10/06 |
| | | | 718/102 |
| 2011/0258594 A1* | 10/2011 | Syme | G06F 8/445 |
| | | | 717/106 |
| 2015/0222564 A1* | 8/2015 | Wheeler | H04L 41/0897 |
| | | | 709/226 |
| 2016/0378575 A1* | 12/2016 | Hansen | G06Q 10/06 |
| | | | 719/318 |
| 2017/0371703 A1* | 12/2017 | Wagner | G06F 9/485 |
| 2018/0365614 A1* | 12/2018 | Palmer | G06Q 10/103 |
| 2021/0224047 A1 | 7/2021 | Wang et al. | |
| 2022/0067750 A1 | 3/2022 | Williams et al. | |

* cited by examiner

DYNAMIC NEXT OPERATION DETERMINATION FOR WORKFLOWS

BACKGROUND

Many enterprises employ predefined workflows to achieve desired automation and compliance results. For example, a predefined workflow may be generated to support a marketing campaign. However, such predefined workflows tend to be limited in scope and relatively static and isolated in that they do not dynamically adjust due to changes in external data (e.g., personnel changes), differences between subject matter (e.g., geographical locations, products, contacts), the passage of long time periods (e.g., days, months, weeks, years), and other operational parameters.

SUMMARY

The described technology provides for automatically generating a next operation in a workflow corresponding to a subject matter. A subject matter data record is received, including one or more historical operations previously executed in the workflow and a workflow template including one or more dynamic workflow nodes. At least one next operation is programmatically generated from the one or more dynamic workflow nodes based on the one or more historical operations previously executed in the workflow, wherein the at least one next operation is parameterized based on content in the subject matter data record. The at least one programmatically generated next operation is output into the workflow for execution.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
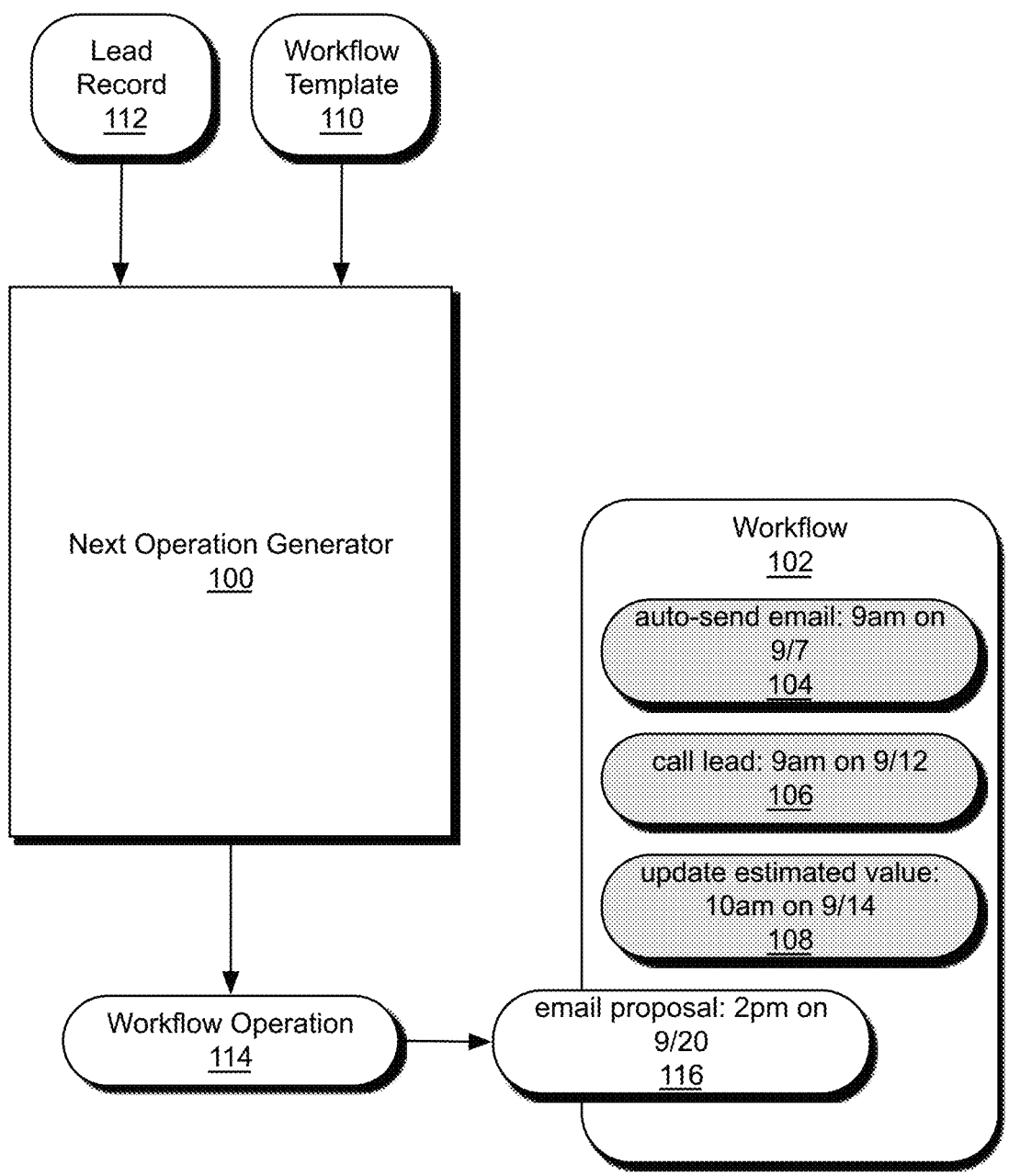
FIG. 1 illustrates an example next operation generator for a workflow.

The described technology provides dynamic determination of a next operation for a workflow. For example, a company may define a sales automation workflow to send out email correspondence at defined intervals, subject to certain conditions being met. As such, the workflow can specify when certain communications are scheduled for automatic or manual completion, and the workflow can adapt based on changes in circumstance.

Moreover, in contrast to outputting a complete static workflow for execution, the described technology generates a next operation in the workflow, each of which may include one or more sub-operations, subject to completion of the previous operation and dependent upon changes in subject matter parameters. For example, if a lead contact changes during the execution of a workflow, the next operation may be parameterized to include the email address of the new lead contact, who may be in a different time zone, and therefore, the timing of email communications to that new lead contact may be adjusted to accommodate a different set of working hours. In one implementation, such changes may be captured in a subject matter data record that is input to a next operation generator, which outputs the next operation based on the changes.

In one example, if a response to an earlier communication was not received from a lead contact by the sales team within a predefined time, a workflow generator can generate a new next operation after a defined time period to automatically send a follow-up email to the lead contact up to a defined number of follow-ups. If no response from the lead contact to the maximum number of follow-ups is received, then the next operation can disqualify the lead contact (e.g., closing the lead contact's profile and terminating the workflow), shift communications to a different contact, or escalate to schedule a phone call to the lead contact, as examples.

In addition to triggering/scheduling next operations, such operations may also be parameterized based on a subject matter data record that includes parameters about the lead contact (e.g., time zone, country, name, specified communication preferences) and records of historical operations (e.g., records about the lead contact's previous responses, about previous proposals made to the lead contact, about the number of previous emails sent to the lead contact). For example, a defined workflow template may include dynamically adjustable nodes that schedule emails to be sent from the company's email system to particular lead contacts based on the contact's time zone so that the email is received during the contact's workday. Alternatively, the company may have determined that emails are considered more effective than phone calls in the United Kingdom, whereas phone calls are more effective in India. Accordingly, the scheduling of such communications can be set based on the lead contact's location. Other parameters may also be applied to the next operation determination.

Technical benefits of such dynamically adjustable nodes in a defined workflow include the opportunity to automatically optimize the workflow based on subject matter parameters (e.g., parameters about the lead contact, about a control system, about a power generation system) and/or on records of historical operations relating to the subject matter, even from disparate systems (e.g., four emails were sent to the lead contact and eventually one chat message was received from the lead contact). In the latter example involving emails and a chat message, the next operation determination can adjust the workflow to switch from email communication to chat message communication with the lead contact.

In addition, such adjustments can be propagated throughout the company. For example, the lead contact parameters may be changed to indicate chat message communication with this content is preferred. In this manner, the entire company's profile about this lead contact can be updated and applied to future workflows (e.g., IT helpdesk workflows, maintenance workflows, invoicing workflows). Such adjustments can optimize future workflows involving this lead contact by proactively initiating a preferred communication channel for that contact. Other technical benefits relating to reducing ineffective communications, maximizing contact engagement, capturing enhanced communication content, etc. may also be achieved.

FIG. 1 illustrates an example next operation generator 100 for a workflow 102. The workflow 102 includes several previously-completed operations, including an auto-send operation 104, a phone call operation 106, and an estimate computation operation 108 (each of these operations is shaded to indicate that they have been completed). The auto-send operation 104 is parametrized to automatically send a marketing email to a lead contact (a "lead") at 9 am on September 7. After completion of the auto-send operation 104, the phone call operation 106 was generated as the next operation and parameterized to schedule (e.g., on the user's calendar or task list) a phone call to the lead at or by 9 am on September 12. Upon completion of the phone call operation 106, the estimate computation operation 108 was generated as the next operation and parameterized to schedule computation of an updated estimated value of a transaction at or on 10 am on September 14.

Furthermore, each of these next operations may be generated based on a workflow template 110 and information from a lead data record 112 (e.g., a subject matter data record), which includes subject matter parameters (e.g., parameters about the lead contact) and/or records of historical operations relating to the subject matter (e.g., the lead). An example workflow template is described with regard to FIG. 3. Generally, a workflow template includes one or more static workflow nodes and/or one or more dynamic workflow nodes, as described with regard to FIG. 3. Furthermore, such nodes may be synchronous and/or asynchronous, as described with regard to FIG. 3.

Upon completion of the estimate computation operation 108, the next operation generator 100 receives as input the lead data record 112, which may have been updated with new information, such as the updated estimated value, a new email from the lead, etc. Based on the lead data record 112 and the workflow template 110, the next operation generator 100 generates a next workflow operation 114, which is added to the workflow 102 as a proposal email operation 116, scheduled at or by 2 pm on September 20. It should be understood that each next operation may include multiple sub-operations (e.g., update proposal document, generate email body, address email, and send email). Upon completion of the proposal email operation 116, execution of the workflow may terminate, or the next operation generator 100 may generate a new next operation based on the workflow template 110 and the lead data record 112.

By using the next operation generator 100 to ingest the lead data record 112 and to generate a next operation based on the lead data record 112 and the workflow template 110, each next operation is informed by up-to-date parameters relating to the subject matter (the lead). Accordingly, rather than simply including a static sequence of operations (e.g., in a static script or list of operations), each next operation can be selected and parameterized according to subject matter parameters and historical operations to provide dynamically adjustable operations throughout the processing of the workflow.

Figure 2:
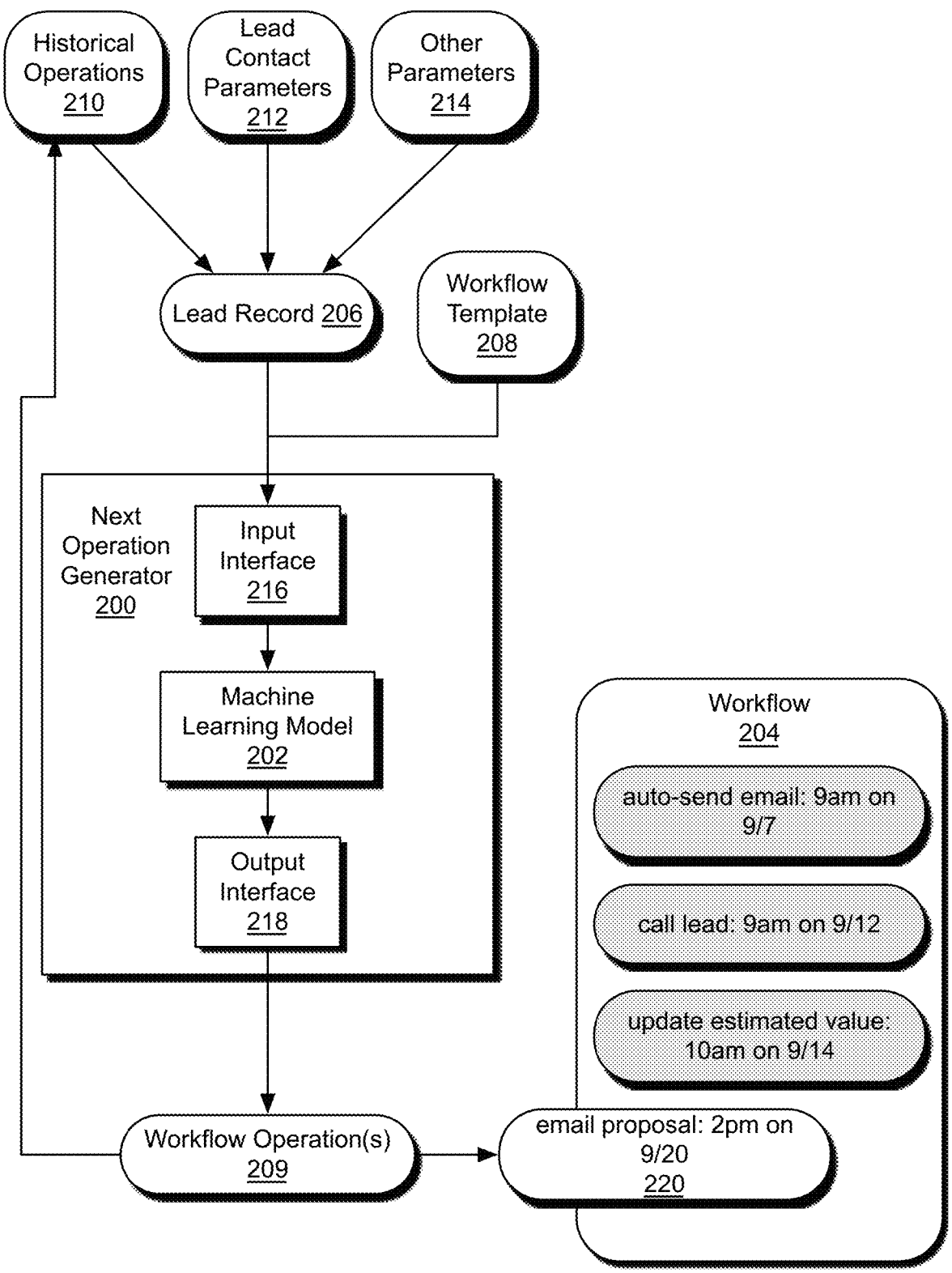
FIG. 2 illustrates an example next operation generator using a machine learning model.

FIG. 2 illustrates an example next operation generator 200 using a machine learning model 202. In the case of the next operation generator 200, the machine learning model 202 is trained using training data, including completed operations, lead contact parameters, and potentially other parameters that can influence the appropriate next operation to be executed in a training workflow. Although the next operation generator 200 of FIG. 2 employs a machine learning model 202, other implementations of a next operation generator 200 may employ a more deterministic programming logic (e.g., using IF-THEN-ELSE constructs and other deterministic flow controls) to determine an appropriate next operation based on available input.

In one implementation, to dynamically determine a next operation for a workflow 204, the next operation generator 200 inputs a lead data record 206, a workflow template 208, and potentially other parameters 214 (e.g., company policies, Dun & Bradstreet information, credit reports). In the illustrated implementation, the lead data record 206 includes data records for historical operations 210 already completed for the workflow 204 and lead contact parameters 212, such as the lead's time zone, country, name, email address, title, etc.

The lead data record 206 and the workflow template 208 are received by the next operation generator 200 through an input interface 216, such as an API, a shared memory region, a file object, etc. According to FIG. 2, the machine learning model 202 uses these inputs to infer a next operation 209 for the workflow 204, which is output via an output interface 218 and added to the workflow 204 as a proposal email operation 220. The "2 pm on September 20" represents a parameter for the execution of the proposal email operation 220 (e.g., automatically executed by an email system, scheduled into a task management system). The previously completed operations in the workflow 204 are shown as shaded and have been previously executed in sequence, from top to bottom. With reference to the proposal email operation 220, the "update estimated value" operation represents the immediately previous next operation, which had been completed before the next operation generator 200 generated the proposal email operation 220.

In an alternative implementation, the next operation generator 200 replaces or supplements the machine learning model 202 with deterministic logic that incorporates the information from lead data record 206 and the workflow template 208 to generate an appropriate next operation with corresponding parameters (e.g., the email recipient, the email body, an attachment).

Figure 3:
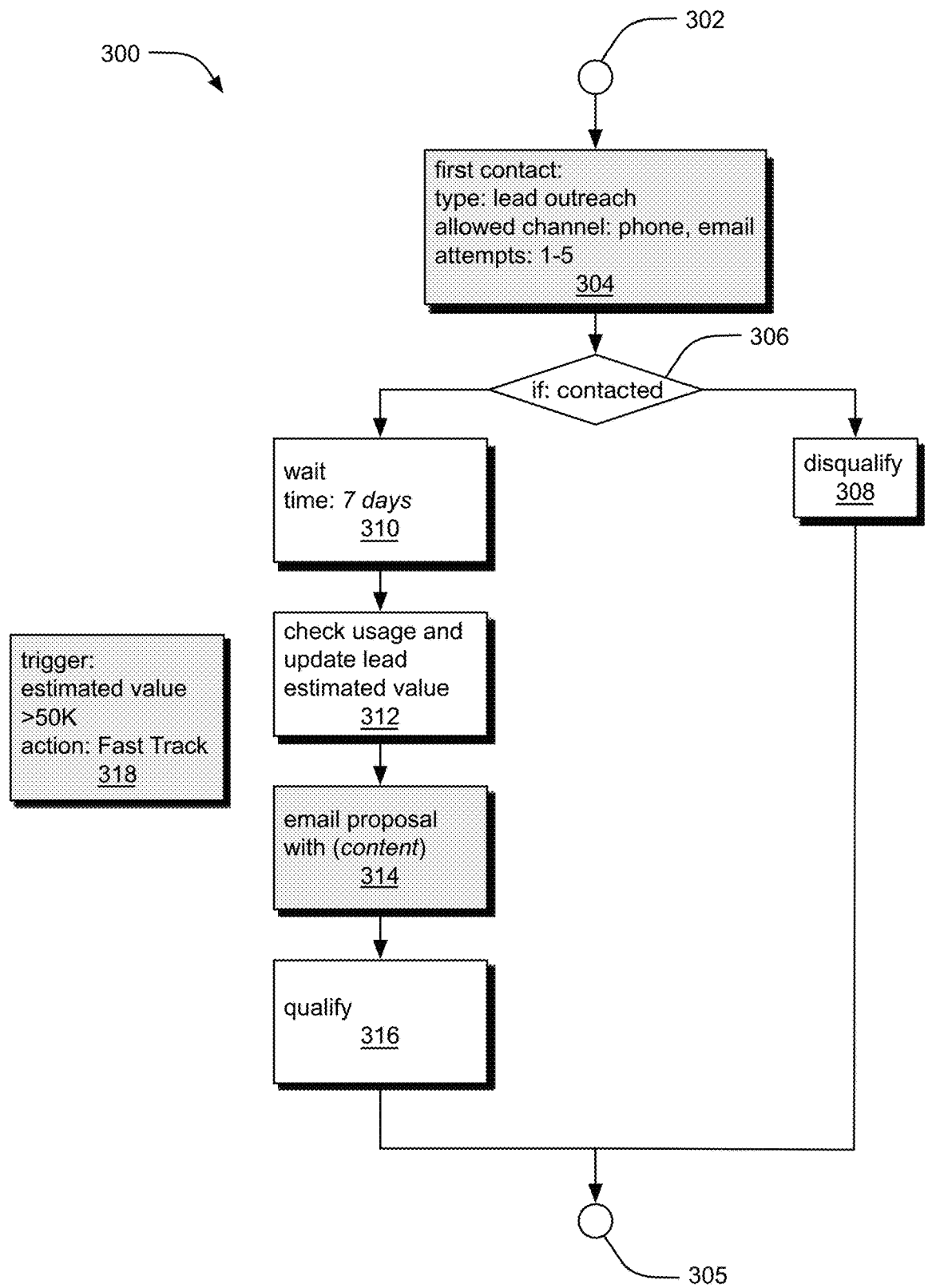
FIG. 3 illustrates an example workflow with static workflow nodes and dynamic workflow nodes.

FIG. 3 illustrates an example workflow template 300 with static workflow nodes and dynamic workflow nodes. The workflow template 300 is typically defined by a company based on industry standards, best practices, and/or its internal policies and procedures, although other influences may also come to bear. The workflow template 300 includes a start node 302 and a stop node 305. Between these two nodes, the workflow template 300 includes synchronous nodes (e.g., first contact node 304, a proposal email node 314, and a qualify node 316) and an asynchronous node 318. The white nodes are static workflow nodes that do not dynamically adjust based on changes in subject matter parameters and/or historical operations, and the shaded nodes indicate that the nodes are dynamic workflow nodes that dynamically adjust based on changes in subject matter parameters and/or historical operations.

When the workflow template 300 is initiated, execution starts at the start node 302 and proceeds sequentially, along the illustrated execution paths and subject to flow controls, such as a (static) decision node 306, until the stop node 305 is reached. The nodes shown between the start node 302 and the stop node 305 are referred to as synchronous nodes because each node waits to execute until the completion of a previous node.

A synchronous node generates next operations until its exit condition is satisfied. For example, the first contact node 304 includes an exit condition of sending one to five emails or scheduling one to five phone calls before exiting. The exit condition can also be satisfied if the recipient responds to a first contact attempt before the completion of all five attempts. The subject matter parameters may be set to space these attempts out in time, such as by 24 hours between attempts. When five attempts are completed without a response or when a response is received, the first contact node 304 exits and transitions to the decision node 306 to direct processing of the workflow template 300. It should be understood that both static and dynamic workflow nodes may be synchronous.

In contrast, a node 318 is referred to as an asynchronous node because it is not within the sequence of the synchronous nodes. Instead, the node 318 is executed to generate one or more next operations when an entry condition is satisfied (and after completion of a pending next operation). For example, as shown in FIG. 3, the node 318 is executed when the estimated value of the project exceeds $50,000 according to the subject matter parameters. The entry condition may be evaluated at any time during the workflow execution, and the node 318 generates a next operation after the completion of the previous next operation, if the entry condition is satisfied. It should be understood that both static and dynamic workflow nodes may be asynchronous based on one or more entry conditions.

In the case of the node 318, the next operation generated is indicated by an action parameter, which defines a next operation to schedule the project for fast track approval within the company, based on the estimated value of the project exceeding $50,000. This next operation is added to the workflow and executed to completion. Upon completion of the node 318, based on satisfaction of its exit condition and completion of its next operation, the node 318 can return processing to the previous point in the workflow template 300 or direct processing to a different re-entry point in the workflow template 300.

In addition to the nodes discussed above, the workflow template 300 also includes a static workflow node 308 setting a "disqualified" status on the lead contact record if no response is received, a static workflow node 310 defining a delay of 7 days after a response is received from the contact, a static workflow node 312 defining a financial update on the subject matter project, and a static workflow node 316 setting a "qualified" status on the lead contact record after receipt of a response and the completion of the next operations for the intervening nodes in the sequence. The workflow template 300 also includes another dynamic workflow node sending an email with a proposal, including parameterized content derived from the subject matter data record and potentially other parameters (e.g., a fillable proposal form, a current pricing schedule).

Accordingly, in at least one implementation, a workflow template may define static and/or dynamic workflow nodes that can be asynchronous or synchronous. Asynchronous nodes are triggered based on the satisfaction of one or more entry conditions defined in the workflow template for each node. Both synchronous and asynchronous nodes may include one or more exit conditions that trigger an exit from a node when an exit condition is satisfied by the subject matter parameters and/or the historical operations. All nodes may include a designation of a next node, whether as the next node in a sequence of synchronous nodes, as a return to a previously executing node or sequence of nodes, or as a jump to any other node in the workflow template 300. Furthermore, in at least one implementation, each next operation is generated from a node in the workflow template 300 upon completion of a previous next operation.

Figure 4:
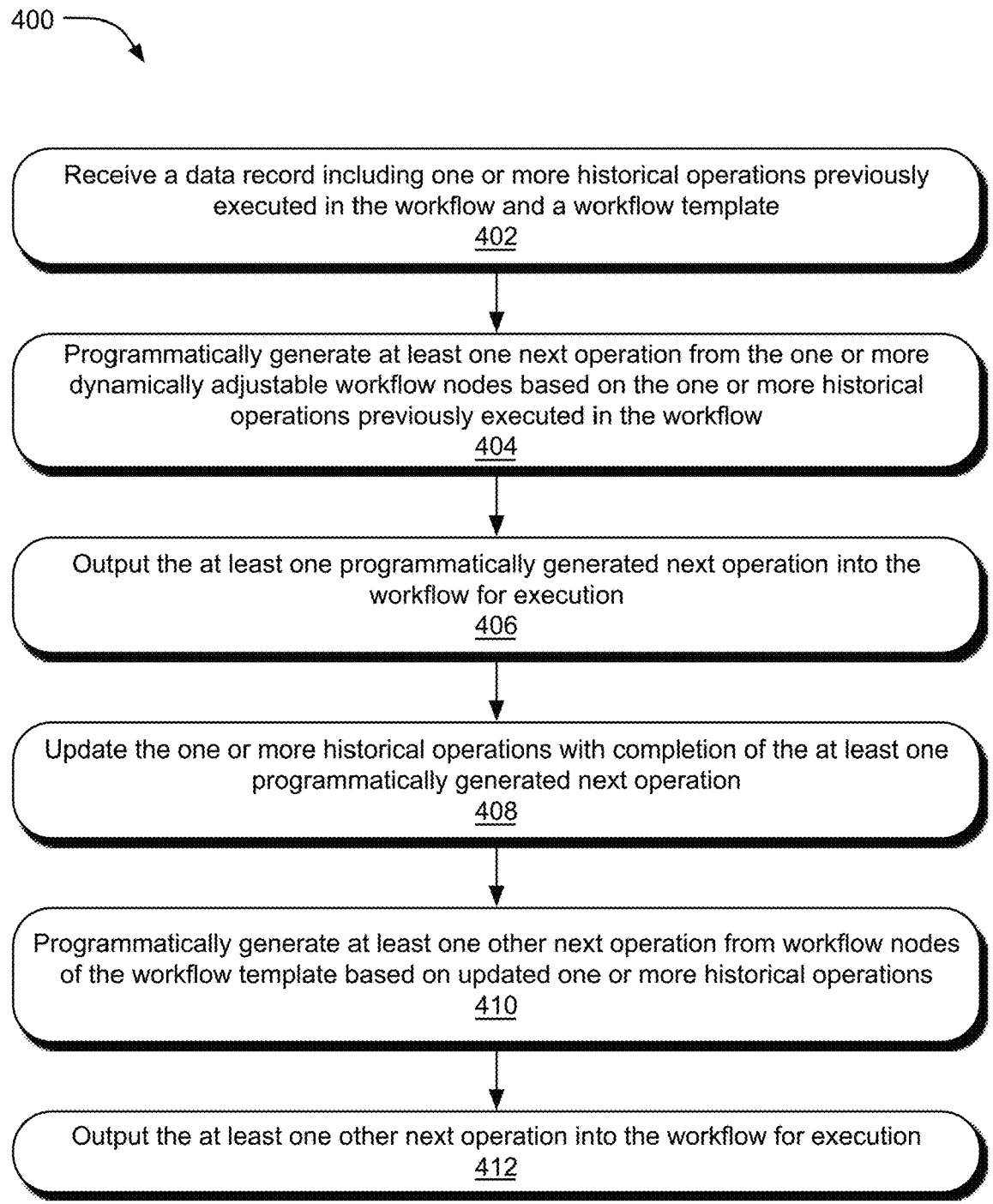
FIG. 4 illustrates example operations for dynamically determining a next operation for a workflow.

FIG. 4 illustrates example operations 400 for dynamically determining a next operation for a workflow. A receiving operation 402 receives a data record including one or more historical operations previously executed in the workflow and a workflow template including one or more dynamic workflow nodes. The data record may also include subject matter parameters corresponding to the subject matter. For example, an email address and/or location of a lead contact, timing periods, follow-up limits, maintenance requirements, security policies, etc. Such subject matter parameters may be employed to parameterize the next operation, such as changing an email address to a new recipient.

A generating operation 404 programmatically generates at least one next operation from the one or more dynamic workflow nodes based on the one or more historical operations previously executed in the workflow. The at least one next operation is parameterized based on content in the data record, such as changes in subject matter parameters or previously completed operations. For example, a dynamic workflow node may specify an exit parameter limiting the number of emails sent to a given recipient to five. After the fifth email is sent, the next operation generation associated with this node terminates, and execution progresses to a different node in the workflow template.

An output operation 406 outputs the at least one programmatically generated next operation into the workflow for execution. For example, the next operation may schedule an email to be set to a recipient, add a task to a task management system, initiate an audit of inventory, execute a cost-based pricing calculation, etc.

When the next operation output in the output operation 406 is completed, and update operation 408 updates the one or more historical operations with completion of the at least one programmatically generated next operation based on the completion of the at least one programmatically generated next operation. Another generating operation 410 programmatically generates at least one other next operation from workflow nodes of the workflow template, based on the updated one or more historical operations. Another output operation 412 outputs the at least one other next operation into the workflow for execution, based on the updated one or more historical operations.

Figure 5:
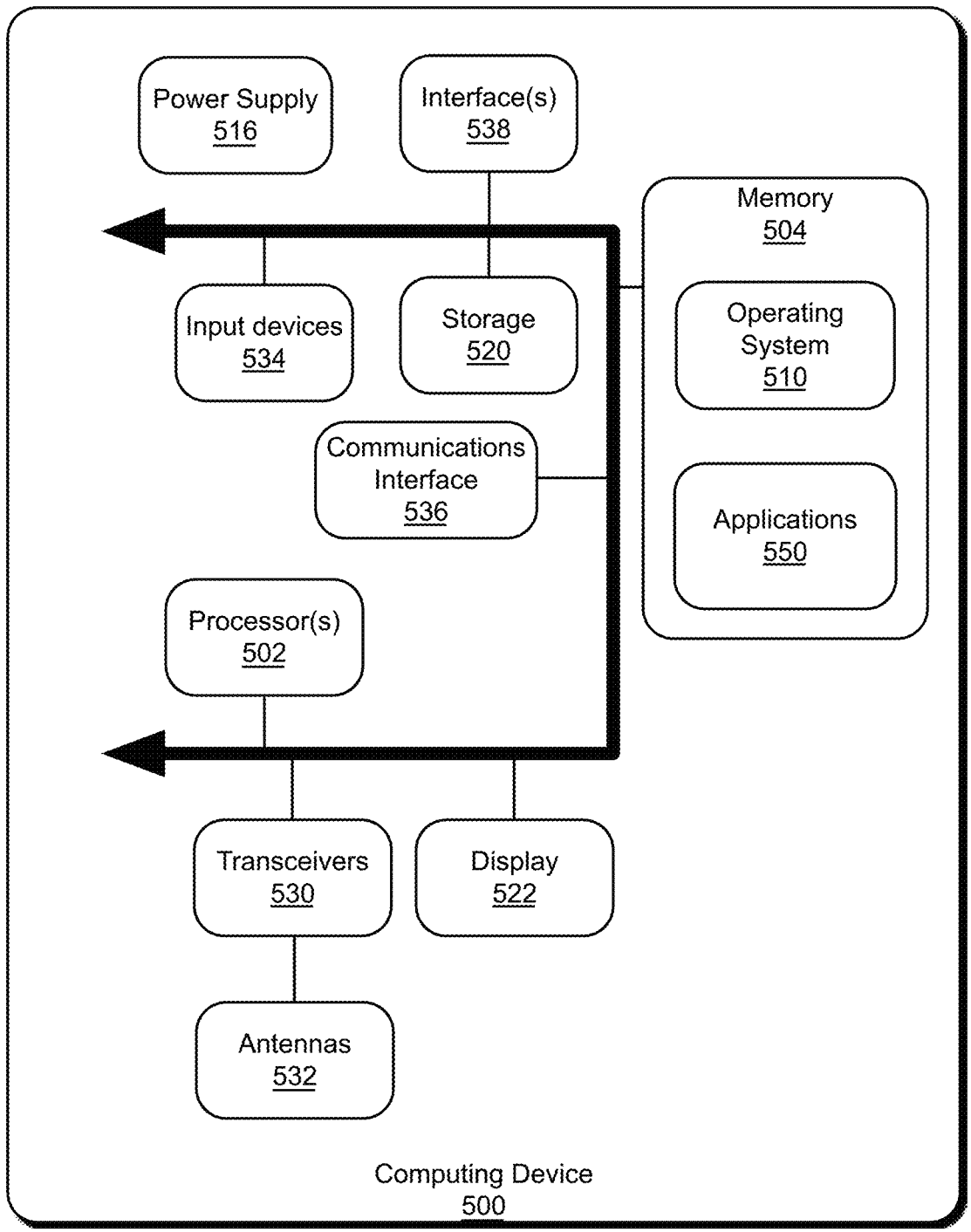
FIG. 5 illustrates an example computing device for use in dynamically determining a next operation for a workflow.

FIG. 5 illustrates an example computing device for use in dynamically determining a next operation for a workflow. The computing device 500 may be a client device, such as a laptop, mobile device, desktop, tablet, or a server/cloud device. The computing device 500 includes one or more processor(s) 502, and a memory 504. The memory 504 generally includes both volatile memory (e.g., RAM) and nonvolatile memory (e.g., flash memory). An operating system 510 resides in the memory 504 and is executed by the processor(s) 502.

In an example computing device 500, as shown in FIG. 4, one or more modules or segments, such as applications 550, an input interface, an output interface, a next operation generator, a machine learning model, deterministic program logic, and other modules are loaded into the operating system 510 on the memory 504 and/or storage 520 and executed by processor(s) 502. The storage 520 may store subject matter parameters, subject matter data records, historical operations, workflow templates, next operations, workflow, and other data and be local to the computing device 500 or may be remote and communicatively connected to the computing device 500. In one implementation, an input interface, an output interface, a next operation generator, and other modules may include circuitry to perform intended functions. In particular, in one implementation, components of the next operation generator may be implemented entirely in hardware or in a combination of hardware circuitry and software.

The computing device 500 includes a power supply 516, which is powered by one or more batteries or other power sources, and which provides power to other components of the computing device 500. The power supply 516 may also be connected to an external power source that overrides or recharges the built-in batteries or other power sources.

The computing device 500 may include one or more communication transceivers 530, which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a communications interface 536 (such as a network adapter or an I/O port, which are types of communication devices. The computing device 500 may use the adapter and any other types of communication devices for establishing connections over a wide-area network (WAN) or local-area network (LAN). It should be appreciated that the network connections shown are exemplary and that other communications devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538, such as a serial port interface, parallel port, or universal serial bus (USB). The computing device 500 may further include a display 522, such as a touch screen display.

The computing device 500 may include a variety of tangible processor-readable storage media and intangible processor-readable communication signals. Tangible processor-readable storage can be embodied by any available media that can be accessed by the computing device 500 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example method of automatically generating a next operation in a workflow corresponding to a subject matter is provided. A subject matter data record including one or more historical operations previously executed in the workflow and a workflow template including one or more dynamic workflow nodes are received. At least one next operation is programmatically generated from the one or more dynamic workflow nodes based on the one or more historical operations previously executed in the workflow, wherein the at least one next operation is parameterized based on content in the subject matter data record. The at least one programmatically generated next operation is output into the workflow for execution. One or more technical benefits provided by these features may include incrementally generating and delivering next operations to a workflow based on a previously completed operation in the workflow and on updated parameters. In this manner, each next operation is dynamically updated with the most recent information impacting the workflow so that the next operation is not stale.

Another example method of any preceding method is provided, further including updating the one or more historical operations with completion of the at least one programmatically generated next operation, based on the completion of the at least one programmatically generated next operation, programmatically generating at least one other next operation from workflow nodes of the workflow template, based on the updated one or more historical operations, and outputting the at least one other next operation into the workflow for execution, based on the updated one or more historical operations. One or more technical benefits provided by these features may include enforcing the updated nature of the next operation by basing it on the completed previous operation.

Another example method of any preceding method is provided, wherein the workflow template includes at least two synchronous workflow nodes including a first synchronous workflow node and a second synchronous workflow node, the first synchronous workflow node defining a next operation to be generated after completion of a next operation defined by the second synchronous workflow node in the workflow. One or more technical benefits provided by these features may include supporting automatic sequential processing of nodes that generate next operations.

Another example method of any preceding method is provided, wherein the workflow template includes at least one dynamic workflow node as an asynchronous workflow node, the asynchronous workflow node defining a next operation triggered based at least upon satisfaction by the subject matter data record of a triggering condition associated with the asynchronous workflow node, wherein the triggered next operation generates a next operation of the workflow. One or more technical benefits provided by these features may include supporting processing of nodes that generate next operations in a non-sequential manner, much like a program interrupt that jumps processing to a different thread after completion of the previous operation.

Another example method of any preceding method is provided, wherein the subject matter data record includes one or more subject matter parameters, and at least one of the one or more dynamic workflow nodes defines an asynchronous operation triggered based at least upon satisfaction of a triggering condition associated with the at least one of the one or more dynamic workflow nodes, wherein the triggered asynchronous operation generates a next operation of the workflow and the next operation of the workflow is based on the one or more subject matter parameters. One or more technical benefits provided by these features may include defining the circumstances that trigger an asynchronous operation. The trigger may depend on historical and completed operations and subject matter parameters.

Another example method of any preceding method is provided, wherein the workflow template further includes one or more static workflow nodes. One or more technical benefits provided by these features may include supporting static workflow nodes in a workflow that do not require the dynamic parameterization or other complex processing to generate a next operation. Such static nodes may use fewer memory and computing resources when generating a next operation.

Another example method of any preceding method is provided, wherein the next operation is parameterized to specify a timing of execution of the next operation within the workflow. One or more technical benefits provided by these features may include using the historical operations and/or subject matter parameters to customize the timing of the next operation, such as by scheduling it for execution at a time relative to the completion of a previous operation or based on other parameters.

An example system for automatically generating a next operation in a workflow corresponding to a subject matter is provided, including one or more hardware processors and an input interface executable by the one or more hardware processors and configured to receive a subject matter data record including one or more historical operations previously executed in the workflow, and a workflow template including one or more dynamic workflow nodes, wherein at least one of the one or more dynamic workflow nodes specifies at least one exit condition for terminating generation of next operations by the at least one of the one or more dynamic workflow nodes. A next operation generator is executable by the one or more hardware processors and configured to programmatically generate at least one next operation from the one or more dynamic workflow nodes based on the one or more historical operations previously executed in the workflow, wherein the at least one next operation is parameterized based on content in the subject matter data record. An output interface is executable by the one or more hardware processors and configured to output the at least one programmatically generated next operation into the workflow for execution.

Another example system of any preceding system is provided, wherein the next operation generator is further configured to update the one or more historical operations with completion of the at least one programmatically generated next operation, based on the completion of the at least one programmatically generated next operation and to programmatically generate at least one other next operation from workflow nodes of the workflow template, based on the updated one or more historical operations, and the output interface is further configured to output the at least one other next operation into the workflow for execution, based on the updated one or more historical operations.

Another example system of any preceding system is provided, wherein the workflow template includes at least two synchronous workflow nodes including a first synchronous workflow node and a second synchronous workflow node, the first synchronous workflow node defining a next operation to be generated after completion of a next operation defined by the second synchronous workflow node in the workflow.

Another example system of any preceding system is provided, wherein the workflow template includes at least one dynamic workflow node as an asynchronous workflow node, the asynchronous workflow node defining a next operation triggered based at least upon satisfaction by the subject matter data record of a triggering condition associated with the asynchronous workflow node, wherein the triggered next operation generates a next operation of the workflow.

Another example system of any preceding system is provided, wherein at least one of the one or more dynamic workflow nodes defines an asynchronous operation triggered based at least upon satisfaction of a triggering condition associated with the at least one of the one or more dynamic workflow nodes, wherein the triggered asynchronous operation generates a next operation of the workflow and the next operation of the workflow is based on the subject matter data record.

Another example system of any preceding system is provided, wherein the workflow template further includes one or more static workflow nodes.

Another example system of any preceding system is provided, wherein the next operation is parameterized to specify a timing of execution of the next operation within the workflow.

One or more example tangible processor-readable storage media embodied with instructions are provided for executing on one or more processors and circuits of a computing device a process for automatically generating a next operation in a workflow corresponding to a subject matter. The process includes receiving a subject matter data record including one or more historical operations previously executed in the workflow and one or more subject matter parameters, receiving a workflow template including one or more dynamic workflow nodes, programmatically generating at least one next operation from the one or more dynamic workflow nodes based on the one or more historical operations previously executed in the workflow and the one or more subject matter parameters, based on completion of an immediately previous next operation in the workflow, and outputting the at least one programmatically generated next operation into the workflow for execution.

Another example of one or more tangible processor-readable storage media of any preceding media is provided, wherein the process further includes updating the one or more historical operations with completion of the at least one programmatically generated next operation, based on the completion of the at least one programmatically generated next operation, programmatically generating at least one other next operation from workflow nodes of the workflow template, based on the updated one or more historical operations, and outputting the at least one other next operation into the workflow for execution, based on the updated one or more historical operations.

Another example of one or more tangible processor-readable storage media of any preceding media is provided, wherein the workflow template includes at least two synchronous workflow nodes including a first synchronous workflow node and a second synchronous workflow node, the first synchronous workflow node defining a next operation to be generated after completion of a next operation defined by the second synchronous workflow node in the workflow.

Another example of one or more tangible processor-readable storage media of any preceding media is provided, wherein the workflow template includes at least one dynamic workflow node as an asynchronous workflow node, the asynchronous workflow node defining a next operation triggered based at least upon satisfaction by the subject matter data record of a triggering condition associated with the asynchronous workflow node, wherein the triggered next operation generates a next operation of the workflow.

Another example of one or more tangible processor-readable storage media of any preceding media is provided, wherein at least one of the one or more dynamic workflow nodes defines an asynchronous operation triggered based at least upon satisfaction of a triggering condition associated with the at least one of the one or more dynamic workflow nodes, wherein the triggered asynchronous operation generates a next operation of the workflow and the next operation of the workflow is based on the one or more subject matter parameters.

Another example of one or more tangible processor-readable storage media of any preceding media is provided, wherein the next operation is parameterized to specify a timing of execution of the next operation within the workflow.

An example system of automatically generating a next operation in a workflow corresponding to a subject matter is provided, including means for receiving a subject matter data record including one or more historical operations previously executed in the workflow and a workflow template including one or more dynamic workflow nodes, means for programmatically generating at least one next operation from the one or more dynamic workflow nodes based on the one or more historical operations previously executed in the workflow, wherein the at least one next operation is parameterized based on content in the subject matter data record, and means for outputting the at least one programmatically generated next operation into the workflow for execution.

Another example system of any preceding system is provided, further including means for updating the one or more historical operations with completion of the at least one programmatically generated next operation, based on the completion of the at least one programmatically generated next operation, means for programmatically generating at least one other next operation from workflow nodes of the workflow template, based on the updated one or more historical operations, and means for outputting the at least one other next operation into the workflow for execution, based on the updated one or more historical operations.

Another example system of any preceding system is provided, wherein the workflow template includes at least two synchronous workflow nodes including a first synchronous workflow node and a second synchronous workflow node, the first synchronous workflow node defining a next operation to be generated after completion of a next operation defined by the second synchronous workflow node in the workflow.

Another example system of any preceding system is provided, wherein the workflow template includes at least one dynamic workflow node as an asynchronous workflow node, the asynchronous workflow node defining a next operation triggered based at least upon satisfaction by the subject matter data record of a triggering condition associated with the asynchronous workflow node, wherein the triggered next operation generates a next operation of the workflow.

Another example system of any preceding system is provided, wherein the subject matter data record includes one or more subject matter parameters, and at least one of the one or more dynamic workflow nodes defines an asynchronous operation triggered based at least upon satisfaction of a triggering condition associated with the at least one of the one or more dynamic workflow nodes, wherein the triggered asynchronous operation generates a next operation of the workflow and the next operation of the workflow is based on the one or more subject matter parameters.

Another example system of any preceding system is provided, wherein the workflow template further includes one or more static workflow nodes.

Another example system of any preceding system is provided, wherein the next operation is parameterized to specify a timing of execution of the next operation within the workflow.

Some implementations may comprise an article of manufacture. An article of manufacture may comprise a tangible storage medium to store logic. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of automatically generating a next operation in an executing instance of a workflow corresponding to a subject matter, the method comprising:
   receiving a subject matter data record including one or more historical operations previously executed in the executing instance of the workflow and a workflow template including one or more dynamic workflow nodes, wherein each of the one or more dynamic workflow nodes are configured to generate one or more next operations for the executing instance of the workflow;

programmatically generating, by one of the one or more dynamic workflow nodes, at least one next operation from the one or more dynamic workflow nodes based on the one or more historical operations previously executed in the executing instance of the workflow, wherein the at least one next operation is parameterized based on content in the subject matter data record; and outputting the at least one programmatically generated next operation into the executing instance of the workflow for execution.

2. The method of claim 1, further comprising:

updating the one or more historical operations with completion of the at least one programmatically generated next operation, based on the completion of the at least one programmatically generated next operation;

programmatically generating at least one other next operation from workflow nodes of the workflow template, based on the updated one or more historical operations; and outputting the at least one other next operation into the executing instance of the workflow for execution, based on the updated one or more historical operations.

3. The method of claim 1, wherein the workflow template includes at least two synchronous workflow nodes including a first synchronous workflow node and a second synchronous workflow node, the first synchronous workflow node defining a next operation to be generated after completion of a next operation defined by the second synchronous workflow node in the executing instance of the workflow.

4. The method of claim 1, wherein the workflow template includes at least one dynamic workflow node as an asynchronous workflow node, the asynchronous workflow node defining a next operation triggered based at least upon satisfaction by the subject matter data record of a triggering condition associated with the asynchronous workflow node, wherein the triggered next operation generates a next operation of the executing instance of the workflow.

5. The method of claim 1, wherein the subject matter data record includes one or more subject matter parameters, and at least one of the one or more dynamic workflow nodes defines an asynchronous operation triggered based at least upon satisfaction of a triggering condition associated with the at least one of the one or more dynamic workflow nodes, wherein the triggered asynchronous operation generates a next operation of the executing instance of the workflow and the next operation of the executing instance of the workflow is based on the one or more subject matter parameters.

6. The method of claim 1, wherein the workflow template further includes one or more static workflow nodes.

7. The method of claim 1, wherein the next operation is parameterized to specify a timing of execution of the next operation within the executing instance of the workflow.

8. A system for automatically generating a next operation in an executing instance of a workflow corresponding to a subject matter, the system comprising:

one or more hardware processors;

an input interface executable by the one or more hardware processors and configured to receive a subject matter data record including one or more historical operations previously executed in the executing instance of the workflow, and a workflow template including one or more dynamic workflow nodes, wherein at least one of the one or more dynamic workflow nodes is configured to generate one or more next operations for the executing instance of the workflow and to specify at least one exit condition for terminating generation of next operations by the at least one of the one or more dynamic workflow nodes;

a next operation generator executable by the one or more hardware processors and configured to programmatically generate, by one of the one or more dynamic workflow nodes, at least one next operation from the one or more dynamic workflow nodes based on the one or more historical operations previously executed in the executing instance of the workflow, wherein the at least one next operation is parameterized based on content in the subject matter data record; and an output interface executable by the one or more hardware processors and configured to output the at least one programmatically generated next operation into the executing instance of the workflow for execution.

9. The system of claim 8, wherein the next operation generator is further configured to update the one or more historical operations with completion of the at least one programmatically generated next operation, based on the completion of the at least one programmatically generated next operation and to programmatically generate at least one other next operation from workflow nodes of the workflow template, based on the updated one or more historical operations, and the output interface is further configured to output the at least one other next operation into the executing instance of the workflow for execution, based on the updated one or more historical operations.

10. The system of claim 8, wherein the workflow template includes at least two synchronous workflow nodes including a first synchronous workflow node and a second synchronous workflow node, the first synchronous workflow node defining a next operation to be generated after completion of a next operation defined by the second synchronous workflow node in the executing instance of the workflow.

11. The system of claim 8, wherein the workflow template includes at least one dynamic workflow node as an asynchronous workflow node, the asynchronous workflow node defining a next operation triggered based at least upon satisfaction by the subject matter data record of a triggering condition associated with the asynchronous workflow node, wherein the triggered next operation generates a next operation of the executing instance of the workflow.

12. The system of claim 8, wherein at least one of the one or more dynamic workflow nodes defines an asynchronous operation triggered based at least upon satisfaction of a triggering condition associated with the at least one of the one or more dynamic workflow nodes, wherein the triggered asynchronous operation generates a next operation of the executing instance of the workflow and the next operation of the executing instance of the workflow is based on the subject matter data record.

13. The system of claim 8, wherein the workflow template further includes one or more static workflow nodes.

14. The system of claim 8, wherein the next operation is parameterized to specify a timing of execution of the next operation within the executing instance of the workflow.

15. One or more tangible processor-readable storage media embodied with instructions for executing on one or more processors and circuits of a computing device a process for automatically generating a next operation in an executing instance of a workflow corresponding to a subject matter, the process comprising:

receiving a subject matter data record including one or more historical operations previously executed in the executing instance of the workflow and one or more subject matter parameters;

receiving a workflow template including one or more dynamic workflow nodes, wherein each of the one or more dynamic workflow nodes are configured to generate one or more next operations for the executing instance of the workflow;

programmatically generating, by one of the one or more dynamic workflow nodes, at least one next operation from the one or more dynamic workflow nodes based on the one or more historical operations previously executed in the executing instance of the workflow and the one or more subject matter parameters, based on completion of an immediately previous next operation in the executing instance of the workflow; and outputting the at least one programmatically generated next operation into the executing instance of the workflow for execution.

16. The one or more tangible processor-readable storage media of claim 15, wherein the process further comprises:

updating the one or more historical operations with completion of the at least one programmatically generated next operation, based on the completion of the at least one programmatically generated next operation;

programmatically generating at least one other next operation from workflow nodes of the workflow template, based on the updated one or more historical operations; and outputting the at least one other next operation into the executing instance of the workflow for execution, based on the updated one or more historical operations.

17. The one or more tangible processor-readable storage media of claim 15, wherein the workflow template includes at least two synchronous workflow nodes including a first synchronous workflow node and a second synchronous workflow node, the first synchronous workflow node defining a next operation to be generated after completion of a next operation defined by the second synchronous workflow node in the executing instance of the workflow.

18. The one or more tangible processor-readable storage media of claim 15, wherein the workflow template includes at least one dynamic workflow node as an asynchronous workflow node, the asynchronous workflow node defining a next operation triggered based at least upon satisfaction by the subject matter data record of a triggering condition associated with the asynchronous workflow node, wherein the triggered next operation generates a next operation of the executing instance of the workflow.

19. The one or more tangible processor-readable storage media of claim 15, wherein at least one of the one or more dynamic workflow nodes defines an asynchronous operation triggered based at least upon satisfaction of a triggering condition associated with the at least one of the one or more dynamic workflow nodes, wherein the triggered asynchronous operation generates a next operation of the executing instance of the workflow and the next operation of the executing instance of the workflow is based on the one or more subject matter parameters.

20. The one or more tangible processor-readable storage media of claim 15, wherein the next operation is parameterized to specify a timing of execution of the next operation within the executing instance of the workflow.

\* \* \* \* \*